(12) United States Patent
Moore, Jr.

(10) Patent No.: US 11,986,768 B2
(45) Date of Patent: May 21, 2024

(54) SYSTEM FOR REMOVING AMMONIA, DUST AND PATHOGENS FROM AIR WITHIN AN ANIMAL REARING/SHELTERING FACILITY

(71) Applicant: The United States of America, as Represented by the Secretary of Agriculture, Washington, DC (US)

(72) Inventor: Philip A Moore, Jr., Fayetteville, AR (US)

(73) Assignee: The United States of America, as Represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 17/715,666

(22) Filed: Apr. 7, 2022

(65) Prior Publication Data

US 2023/0321587 A1    Oct. 12, 2023

(51) Int. Cl.
    *B01D 53/14*      (2006.01)
    *A01K 1/00*      (2006.01)
    (Continued)

(52) U.S. Cl.
    CPC ........ *B01D 53/1406* (2013.01); *A01K 1/0082* (2013.01); *B01D 47/06* (2013.01);
    (Continued)

(58) Field of Classification Search
    CPC .............. B01D 53/1406; B01D 47/06; B01D 53/1412; B01D 53/1425; B01D 53/1456;
    (Continued)

(56) References Cited

U.S. PATENT DOCUMENTS

3,386,804 A * 6/1968 Neugebauer .............. C01C 1/12
    423/237
3,966,450 A * 6/1976 O'Neill ................... A61L 11/00
    210/759

(Continued)

FOREIGN PATENT DOCUMENTS

CN    105664713 A * 6/2016 ............. B01D 53/04
CN    107511068 A * 12/2017

(Continued)

OTHER PUBLICATIONS

Epo translation of WO 2014/175209 (Year: 2014).*

(Continued)

*Primary Examiner* — Stephen Hobson
(74) *Attorney, Agent, or Firm* — John Fado; Maria Restrepo-Hartwig

(57) ABSTRACT

An air purification and recirculation system positioned within an animal rearing/sheltering facility. The system draws untreated air into an elongated air treatment apparatus having a dust scrubbing section, an ammonia scrubbing section, and acid scrubbing section, configured so that the treatment sections are positioned in series. At the end of the air treatment process, the treated air is exhausted back into the animal rearing facility so that the air is circulated within the facility. Acid and water used during the air treatment process are continuously recycled and directed back through the scrubbers in the air treatment apparatus.

43 Claims, 4 Drawing Sheets

(51) Int. Cl.
  *B01D 47/06* (2006.01)
  *B01D 53/18* (2006.01)
  *B01D 53/32* (2006.01)
  *C02F 1/00* (2023.01)
  *B01D 53/58* (2006.01)
(52) U.S. Cl.
  CPC ..... *B01D 53/1412* (2013.01); *B01D 53/1425* (2013.01); *B01D 53/1456* (2013.01); *B01D 53/1493* (2013.01); *B01D 53/185* (2013.01); *B01D 53/323* (2013.01); *C02F 1/001* (2013.01); *B01D 53/58* (2013.01); *B01D 2252/103* (2013.01); *B01D 2257/406* (2013.01); *B01D 2258/0266* (2013.01)
(58) Field of Classification Search
  CPC .............. B01D 53/1493; B01D 53/185; B01D 53/323; B01D 53/58; B01D 2252/103; B01D 2257/406; B01D 2258/0266; A01K 1/0082; C02F 1/001
  See application file for complete search history.

(56) References Cited

U.S. PATENT DOCUMENTS

| | | | | |
|---|---|---|---|---|
| 5,017,203 A | * | 5/1991 | Cox | B05B 14/46 96/282 |
| 5,666,905 A | * | 9/1997 | Mackin | A01K 31/04 119/448 |
| 5,865,143 A | * | 2/1999 | Moore, Jr. | A61L 9/01 239/210 |
| 5,890,454 A | * | 4/1999 | Moore, Jr. | A01C 3/00 119/447 |
| 5,961,968 A | * | 10/1999 | Moore, Jr. | A61L 9/01 422/4 |
| 5,984,993 A | * | 11/1999 | Mainz | C02F 1/76 422/5 |
| 6,019,818 A | * | 2/2000 | Knapp | B01D 47/06 96/272 |
| 6,346,240 B1 | * | 2/2002 | Moore, Jr. | C02F 11/143 424/76.8 |
| 6,358,729 B1 | * | 3/2002 | Ferranti | B01D 53/75 435/293.1 |
| 6,616,843 B1 | * | 9/2003 | Behmann | C02F 3/301 210/636 |
| 7,194,979 B2 | * | 3/2007 | Moore, Jr. | A01K 1/0047 119/448 |
| 8,354,086 B2 | * | 1/2013 | Murray | F01N 3/0807 423/220 |
| 8,663,551 B1 | * | 3/2014 | Moore, Jr. | B01D 53/58 422/4 |
| 2004/0040516 A1 | * | 3/2004 | Jensen | C05F 3/00 119/447 |
| 2008/0070290 A1 | * | 3/2008 | Guldberg | B01D 53/84 435/297.2 |
| 2008/0241886 A1 | * | 10/2008 | Herrema | C12N 1/30 435/189 |
| 2010/0120104 A1 | * | 5/2010 | Reed | C12P 7/649 435/166 |
| 2010/0129895 A1 | * | 5/2010 | Crawford | B01D 53/18 435/262.5 |
| 2011/0011800 A1 | * | 1/2011 | Cord-Ruwisch | C02F 3/302 210/620 |
| 2013/0137170 A1 | * | 5/2013 | Yang | B01D 53/85 435/289.1 |
| 2014/0338539 A1 | * | 11/2014 | Park | B01D 53/18 96/324 |
| 2015/0086435 A1 | * | 3/2015 | Zhao | B01D 53/1493 422/168 |
| 2016/0067652 A1 | * | 3/2016 | Moore, Jr. | C05F 17/90 435/297.1 |
| 2019/0327941 A1 | * | 10/2019 | Rust | A01K 31/22 |
| 2021/0031154 A1 | * | 2/2021 | Nakamura | B01J 10/02 |
| 2022/0106212 A1 | * | 4/2022 | Montes Cuen | B01D 21/01 |
| 2023/0191310 A1 | * | 6/2023 | Park | B01D 46/0036 422/171 |

FOREIGN PATENT DOCUMENTS

| | | | | |
|---|---|---|---|---|
| CN | 109092026 A | * | 12/2018 | |
| CN | 110292850 A | * | 10/2019 | |
| CN | 110314505 A | * | 10/2019 | |
| CN | 110651718 A | * | 1/2020 | |
| CN | 111359435 A | * | 7/2020 | |
| CN | 111701433 | * | 9/2020 | |
| CN | 111701433 A | * | 9/2020 | |
| CN | 111715056 | * | 9/2020 | |
| CN | 111715056 A | * | 9/2020 | |
| CN | 112791575 A | * | 5/2021 | ............. A61L 2/085 |
| CN | 112957870 | * | 6/2021 | |
| CN | 112957870 A | * | 6/2021 | ........... B01D 53/002 |
| CN | 112973407 A | * | 6/2021 | ............. B01D 50/00 |
| CN | 113230814 A | * | 8/2021 | |
| KR | 100546061 | * | 1/2006 | |
| KR | 2006065854 A | * | 6/2006 | ............. B01D 45/12 |
| KR | 20100023078 | * | 3/2010 | |
| WO | WO-2014175209 A1 | * | 10/2014 | ............. B01D 47/06 |
| WO | WO-2015048969 A1 | * | 4/2015 | ............. B01D 45/08 |
| WO | WO-2017211280 A1 | * | 12/2017 | ......... B01D 53/1456 |
| WO | WO-2021262002 A1 | * | 12/2021 | ................ A01C 3/00 |
| WO | WO-2022069782 A1 | * | 4/2022 | ............. B01D 53/229 |

OTHER PUBLICATIONS

Epo translation of KR20100023078 (Year: 2010).*
Famco "Hooded Wall Vent With Spring Loaded Damper, Gasket And Screen—Aluminum" published Nov. 30, 2021 accessed at <https://web.archive.org/web/20211130223310/https://www.famcomfg.com/product/hooded-wall-vent-with-spring-loaded-damper-gasket-and-screen-aluminum/> (Year: 2021).*
Epo translation of KR100546061 (Year: 2006).*
Epo translation of CN112957870 (Year: 2021).*
Epo translation of WO2017211280 (Year: 2017).*
Epo translation of CN111715056 (Year: 2020).*
Epo translation of CN 111701433 (Year: 2020).*

* cited by examiner

SYSTEM FOR REMOVING AMMONIA, DUST AND PATHOGENS FROM AIR WITHIN AN ANIMAL REARING/SHELTERING FACILITY

FIELD OF THE INVENTION

The disclosed subject matter relates to an air purification and circulation system that removes ammonia, dust, and pathogens from air being recirculated within a facility for rearing/sheltering animals. Specifically, the subject matter described herein relates to a multistage system in which the particulate matter (dust), pathogens and ammonia are removed from the air inside a poultry or swine facility preferably using recycled liquids (water and acid, respectively), which are kept virtually particulate-free via a filtration system.

BACKGROUND OF THE INVENTION

One of the biggest environmental and production challenges associated with raising animals in confined conditions is the production and emission of ammonia ($NH_3$)—which frequently reaches high concentrations in the air within an animal confinement facility. High concentrations of ammonia in poultry facilities cause reduced growth rates, poor feed conversion, reduced egg production and increase the animals' susceptibility to diseases, such as Newcastle disease and airsaculitis in poultry. High levels of ammonia also pose health issues for humans who work in the facilities.

Ammonia emissions from animal rearing facilities also result in air, soil, and water pollution. Ammonia reacts with sulfate and nitrate in the atmosphere to form fine particulates which can cause human respiratory problems and haze. Ammonia deposition can result in eutrophication due to excessive nitrogen loading via wet and dry fallout in both aquatic and terrestrial systems. Once deposited from the atmosphere, ammonia can be converted to nitrate in soils via nitrification—a process which can cause serious soil acidification. In some European countries (e.g. the Netherlands), ammonia emissions are closely regulated by the government. As a result, many of the European swine barns and some poultry barns have utilized expensive ammonia scrubbers for decades. These scrubbers purify the air as it is exhausted from these facilities (i.e.—end of pipe technology) using sulfuric acid to capture ammonia. Since the air inside these facilities is not being purified, the only economic benefit to farmers from these systems is the capture of nitrogen, which can be used as fertilizer. However, nitrogen fertilizer is relatively inexpensive and has about the same value as the acid used to scrub the nitrogen from the air. Consequently, from an economic perspective, these scrubbers are not cost-effective.

Similarly, the ammonia scrubbers developed by the US Department of Agriculture (USDA), Agricultural Research Service (ARS) (e.g. U.S. Pat. Nos. 7,194,170 and 8,663,551), the Ohio State University (e.g. U.S. Pat. Nos. 8,961,915, 9,364,787, and 9,808,758), North Carolina State University (Shah et al., 2008; Trans. ASABE 51:243-250), Purdue University (Lahav et al., 2008; Water Air Soil Pollut 191:183-197) and the University of Arkansas (Bandekar et al., 2008; ASABE paper 083945) are also all "end of pipe" technology which use sulfuric acid, other acids or water to remove ammonia from the air after it is exhausted from poultry and swine facilities. Since the only economic benefit from these end-of-pipe ammonia scrubbers is the capture of nitrogen, which is relatively cheap, these scrubbers are not currently used in the United States.

The only technology that is widely used in the US for controlling ammonia levels in poultry houses is treating poultry litter with acidifying chemicals, such as aluminum sulfate (alum) or sodium bisulfate, which shift the ammonia/ammonium equilibrium in the litter towards ammonium as a result of lower litter pH, which reduces ammonia emissions. Lowering ammonia levels results in heavier birds, better feed conversion, and a lower mortality rate. Lowering the ammonia level with acidifying chemicals also lowers propane use (relative to "end of pipe" ventilation) due to decreased ventilation requirements. However, acid litter amendments only work for the first 2-4 weeks of a flock when the litter pH is below 7. After that time, ammonia emissions resume, and much of the ammonia that was captured can be released into the air. Consequently, other methods of controlling ammonia inside chicken houses are needed that will control ammonia concentrations throughout the flock The biggest hurdle for the development of ammonia scrubbers for poultry houses (particularly broiler houses) is the tremendous amount of dust present in the air, which quickly builds up inside scrubbers, causing clogging of nozzles used for spraying water or acid, and clogging of demisters. Simple filters, such as the filters used in conventional air conditioning and heating systems, are not at all feasible for broiler houses because they would clog almost immediately due to excessive dust. In order to develop an ammonia scrubber for broiler houses, a radical change in the entire scrubber system is needed that can remove all particulate material from the air without causing any clogging in the system.

Therefore, the need exists for a cost-effective and efficient air purification system for removing the ammonia, dust and pathogens from the air inside animal rearing/housing facilities that recirculates the treated air within the facility. The current invention is an innovative air scrubbing system which removes ammonia, particulate material and pathogens from the air during the purification process. The system preferably utilizes fast sand-type filters to remove particulate matter from liquids being sprayed to prevent clogging in the system. Lower ammonia levels inside animal rearing facilities will result in several economic benefits, including improved animal weight gains and feed conversion, reduced susceptibility to disease, lower mortality and decreased ventilation rates, which result in less propane needed for heating. Lower propane use will result in significant reductions in carbon dioxide emissions, thereby improving the operation's carbon footprint. The lower ammonia, dust and pathogen concentrations in the air will also provide a healthier working environment for the people working in the affected facilities.

SUMMARY OF THE INVENTION

This disclosure is directed to an air purification and circulation system designed to purify and circulate air within an animal rearing/sheltering facility. In accordance with the current invention, air from inside the facility is drawn into the air purification and circulation system. Specifically, the air is first drawn into a dust scrubbing section of the system. The dust scrubbing section includes at least one dust scrubbing water sprayer that sprays a fine mist of particulate-free water. In the dust scrubbing section, airborne particulate matter (including dust and pathogens) collides with water droplets and is removed from the air by absorption. The water with entrained dust then falls to the bottom of the dust scrubbing section. The system is structured so that the contaminated water then flows via gravity to a fast sand filter where the particulate matter is removed from the water. The resulting particulate-free water is then recycled back through the dust scrubbing water sprayers.

After the air leaves the dust scrubbing section, the air flows into an ammonia scrubbing section that is positioned in tandem with the dust scrubbing section. The ammonia scrubbing section comprises at least one ammonia scrubbing acid sprayer that sprays a fine particulate-free acidic treatment solution. In the ammonia scrubbing section, airborne ammonia collides with fine droplets of the acid solution and is removed from the air by absorption. The droplets then fall to the bottom of the ammonia scrubbing section. Fugitive dust which was not collected in the dust scrubbing section will also be captured via collision with the acid droplets and will also fall to the bottom of this chamber. The system is structured so that the acidic solution containing captured ammonia and particulate matter flows by gravity to a second fast sand filter where the particulate matter is removed from the acidic solution. The resulting particulate-free acidic treatment solution is then recycled back through the ammonia scrubbing acid sprayers.

After the air leaves the ammonia scrubbing section, the air flows into an acid scrubbing section that is positioned in tandem with the ammonia scrubbing section. The acid scrubbing section comprises at least one acid scrubbing water sprayer spraying a particulate-free fine water mist. In the acid scrubbing section, the nozzles will be spraying medium-sized water droplets to capture fugitive acid droplets that drifted into this section via absorption. The increase in the size of the droplets from fine (145 to 225) to medium sized (226 to 325 um) will greatly increase the droplet weight. Heavier droplets fall more quickly and are less affected by air movement, which will result in less drift of water droplets into the final section. The medium sized water droplets will also combine with fugitive particulate matter and ammonia that was not removed in the dust scrubbing or ammonia scrubbing sections. The water containing fugitive acid, dust and ammonia will fall to the floor and flow to a drain, where it will flow back to first fast sand filter, where any particulate matter is removed before it is recycled back into the dust scrubbing and the acid scrubbing sections.

After the air leaves the acid scrubbing section, it will pass into the demisting section that is positioned in tandem with the acid scrubbing section. The airflow will change from horizontal to vertical in this section, then the air will pass through a demister before exiting the scrubber.

Wherein, the system is structured so that, as air is drawn into the system, the dust scrubbing section of the system removes airborne dust from the air, and the ammonia scrubbing section removes airborne ammonia from the air. The air then flows into the acid scrubbing section which removes any remaining acid fumes from the air. After the air leaves the acid scrubbing section, the purified air then passes through one or more demisters to remove water droplets and the air is exhausted back into the animal rearing/housing facility.

Note that some assemblies/systems in the FIGs. may contain multiple examples of essentially the same component. For simplicity and clarity, only one (or a few) of the example components may be identified with a reference number. Unless otherwise specified, other non-referenced components with essentially the same structure as the exemplary component should be considered to be identified by the same reference number as the exemplary component. Also note that the FIGs. are not intended to be to scale.

DETAILED DESCRIPTION OF PREFERRED EMBODIMENTS

Figure 1:
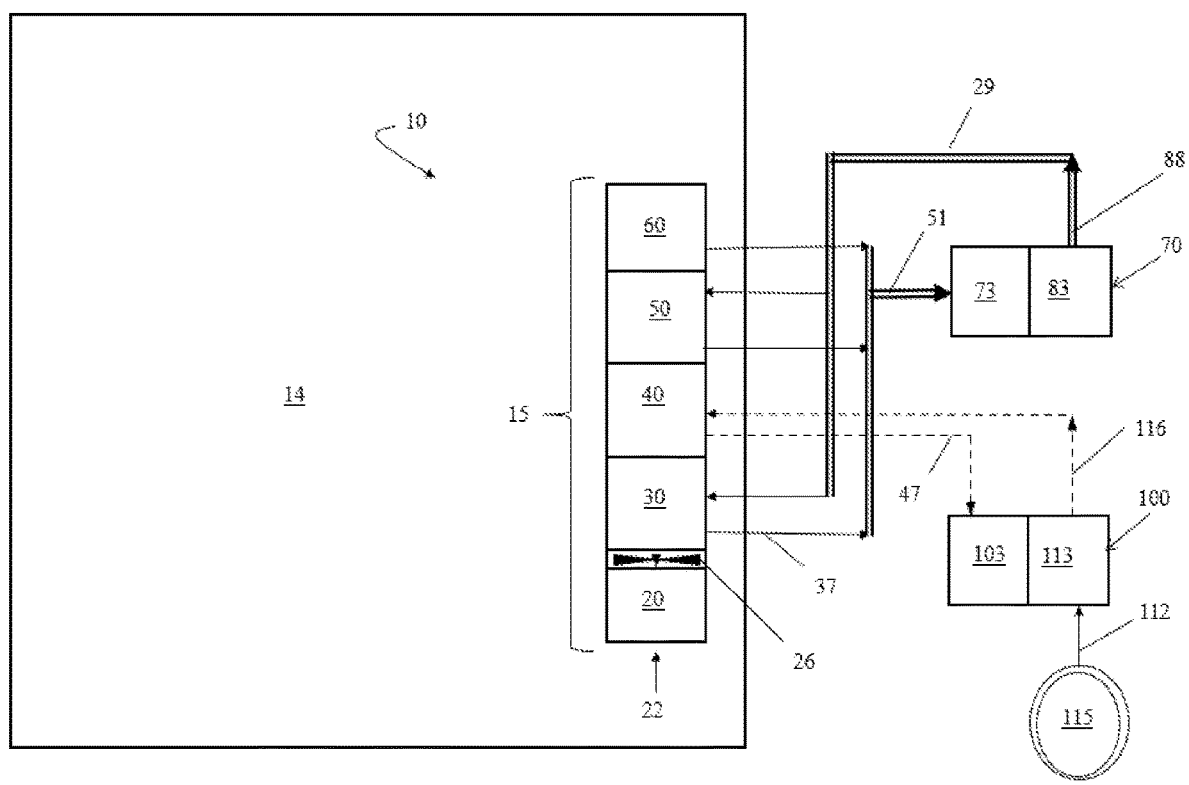
FIG. 1 is a top schematic view of the current air purification and circulation system 10, as the system 10 would be installed in an animal rearing facility 14 to remove the ammonia, dust, and pathogens from the air, and to continuously recirculate the air within the facility 14.

As generally shown in FIG. 1, the method and apparatus described herein comprises an air purification and recirculation system 10 that scrubs at least ammonia, dust, and pathogens from the air inside an animal rearing/housing facility 14. Specifically, the system 10 comprises an air treatment apparatus 15, a water filter system 70, and an acid filter system 100. In the preferred embodiment, the system 10 is positioned so that untreated air comprising dust, ammonia, and pathogens is drawn into an air inlet section 20 of the air treatment apparatus 15. As the untreated air flows through the air treatment apparatus 15 in the direction of the arrow 22, multiple treatment sections 30, 40, 50, and 60 remove dust, pathogens, ammonia, acid droplets/fumes and water droplets from the air. Ultimately, the treated/scrubbed air is exhausted upwardly back into the housing facility 14 through the outlet section 60 of the air treatment apparatus 15.

For the purposes of this disclosure, an "animal rearing/housing facility" 14 may comprise a conventional barn-type facility having a roof and walls enclosing an animal housing/rearing area. This definition encompasses essentially all animal containment facilities 14 having a roof and walls enclosing the animal containment area. In the preferred embodiment, the facility 14 is structured so that the air treatment apparatus 15 of the system 10 is enclosed within the animal rearing/housing facility 14. In alternative embodiments, the water and acid filter systems 70, 100, and the concentrated acid tank 115 may also be enclosed within the facility 14.

As shown in FIG. 1, the sections 20, 30, 40, 50, 60 have a square/rectangular shape/lateral cross section, and each individual section 20, 30, 40, 50, 60 is modular. In the preferred embodiment, the sections 20, 30, 40, 50, 60 are comprised of sheet metal that (at least in the interior) is covered with an acid-tolerant coating such as a plastic. In alternative embodiments, the sections 20, 30, 40, 50, 60 may have a circular, elliptical, tubular, pentagonal, hexagonal, or an octagonal shape, or any other shape known in the art consistent with the function of the specific section 20, 30, 40, 50, 60 as described herein. The materials of construction may include any metal, plastic, composite, fiberglass, or other materials consistent with the function described herein. In one further embodiment, the air treatment apparatus 15 may comprise a singular tubular duct comprised of a plastic (e.g. PVC, HDPE, etc.).

Figure 2:
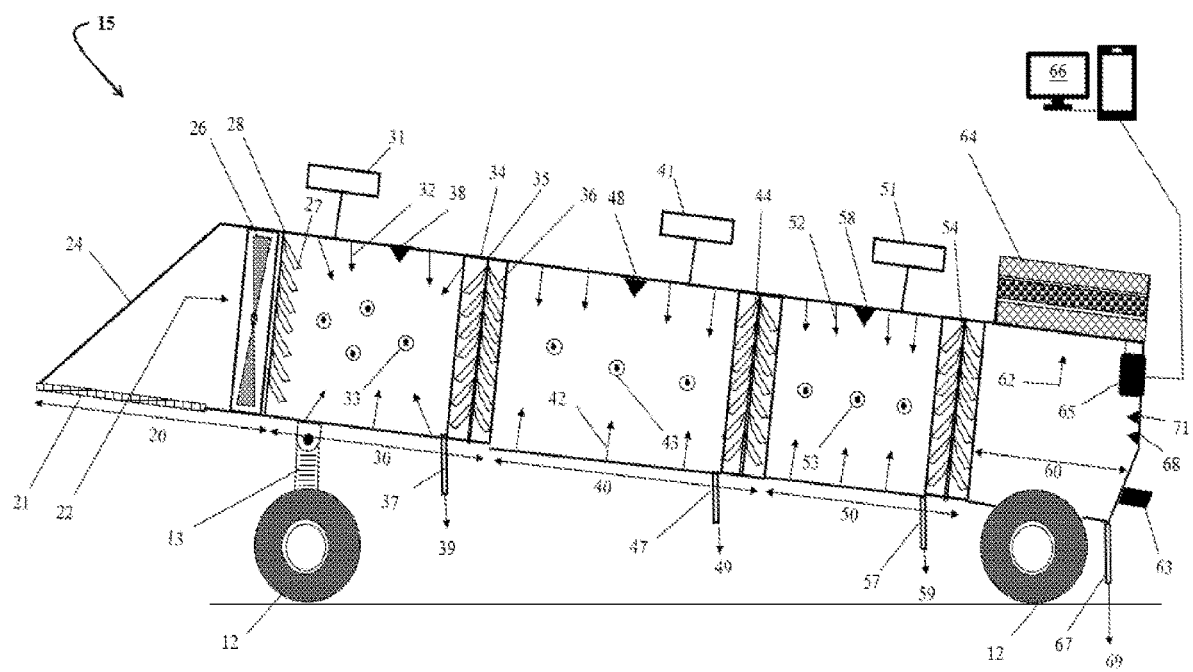
FIG. 2 is a cross-sectional schematic view of the air treatment apparatus 15 of the system 10 shown in FIG. 1.

As best shown in FIG. 2, the air treatment apparatus 15 is preferably mobile so that the treatment apparatus 15 may be moved out of the facility 14 when the facility 14 is periodically cleaned and refurbished. A mobile unit is particularly useful for existing animal rearing facilities. In alternative embodiments, such as when a new animal rearing facility 14 is being constructed, the air treatment apparatus 15 may be built into the sidewalls of the animal rearing facility 14, and may not be mobile, as required for specific applications.

As shown in FIG. 2, the air treatment apparatus 15 preferably includes a set of wheels 12, a towing hitch 63, and an elevating mechanism 13 for tilting the air treatment apparatus 15 rearward. The elevating mechanism 13 may comprise a hydraulic, pneumatic, electrical, or mechanical elevating system for raising the front portion of the system 10. The elevating mechanism 13 may comprise telescoping, ratcheting, or screw type elevating components, or any other elevating means known in the art. The air treatment apparatus 15 is inclined rearwardly so that any liquid solution falling to the bottom of one of the treatment sections 30, 40, 50, 60 will drain rearwardly toward one of the treatment section drains 37, 47, 57, 67.

In operation, as shown in FIG. 2, untreated air is initially drawn into the air inlet section 20 in the direction of the arrow 22. An air inlet duct 24 is angled downwardly and the air inlet aperture is covered with a screen or grate 21, primarily for safety purposes and to prevent unintended objects from being ingested into the air treatment apparatus 15. The air that is drawn into the inlet section 20 is pushed through the sections 30, 40, 50, 60 by a powerful variable speed fan 26.

The variable speed fan 26 pushes the incoming air through an air inlet partition 28 and into a dust scrubbing section 30. In the preferred embodiment, the air inlet partition 28 comprises a planar, vertical, wall-type slotted structure with angled slats 27 extending from the wall. The partition 28 is configured so that most of the liquid in the dust scrubbing section 30 is retained and stays within the section 30. In alternative embodiments, the dust scrubbing section partition 28 may comprise any structure known in the art consistent with the function of retaining spray and moisture within the dust scrubbing section 30 while allowing incoming air to flow into the section 30.

In the dust scrubbing section 30, a system of water sprayers 32 continuously sprays fine, particle-free water droplets that collide with and remove airborne particulate matter (dust) and pathogens from the incoming air via absorption. The "muddy" water with entrained dust particles then falls to the bottom of the dust scrubbing section 30, and then runs out of the air treatment apparatus 15 through the dust scrubbing section drain 37 in the direction of the arrow 39.

For the purposes of this disclosure, a "sprayer" is defined as essentially anything that sprays. The term "sprayer" includes all types of nozzles (including jet nozzles), as well as configurations that only comprise an aperture and may not include a conventional nozzle at all. In the preferred embodiment, the sprayers described herein (32, 33, 42, 43, 52, 53) are fitted with cone or hollow cone spray tips that produce fine or medium sized droplets. Anti-clogging nozzles could also be utilized, but should not be needed since the water and acid solution being sprayed will be virtually particulate-free.

As shown in FIG. 2, the sprayers 32 may extend and be deployed horizontally, laterally, vertically, or angularly into the dust scrubbing section 30. The FIG. 2 components associated with reference number 33 are intended to schematically show sprayers extending laterally into the dust scrubbing section 30. The sprayers 32, 33 may be flush with the wall of the dust scrubbing section 30, or the sprayers 32 may extend/project out from the wall various distances into the interior of the section 30. The sprayers may also spray in the direction of the airflow, opposite the direction of the air flow, or across the airflow. Essentially, any configuration of sprayers 32, 33 configured to spray a particle-free mist into the in interior of the dust scrubbing section 30 should be considered to be within the scope of the invention, The other sprayers 42, 43, 52, 53 in the air treatment apparatus 15 may be similarly designed and deployed.

As shown in FIG. 1, a water supply trunk line 29 extends from the reservoir 83 of the fast sand water filter system 70 and supplies recycled particulate-free water to the dust scrubbing section 30. Ultimately, the recycled water is supplied to the dust scrubbing section water sprayers 31, 33, as shown in FIG. 2.

As best shown in FIGS. 1 and 2, the muddy water (i.e. water with entrained particulate matter, dust, and pathogens) from the dust scrubbing section 30 flows out of the drain line 37 in the direction of the arrow 39. The drain line 37 connects with a return trunk line 51, which flows back into the fast sand water filter system 70. The purpose of the fast sand filter system 70 is to quickly separate the particulate matter/dust/mud/pathogens from the water flowing out of the dust scrubbing section 30.

As shown in FIGS. 1 and 3, the water filter system 70 comprises a filter medium side 73, and a reservoir side 83. The filter medium side 73 comprises a "fast sand water filter". As best shown in FIG. 3, during routine operations, a significant amount of dust/mud will accumulate on the surface in the filter side 73 of the water filter system 70. The fast sand water filter system 70 is preferably positioned so that a top or cover may be removed and the accumulated dust/mud can be quickly and easily removed with minimal interruption in system 10 operations. In the preferred embodiment, a removeable cage-like structure with a screen on top and metal supports underneath is placed on top of the sand filter to facilitate easy removal of the accumulated sediment.

For the purposes of this disclosure, a "fast sand water filter" comprises a filter structure wherein incoming liquid is filtered through at least one layer (and preferably multiple layers) of sand and/or rock as a means of removing (at least) particulate material from the incoming liquid.

In the preferred embodiment, the fast sand water filter medium 73 comprises a first layer of fine sand 72; a layer of coarse sand 74; a layer of pea gravel 76; and a layer of large stones 78. A separating grate/screen may cover the top of the fine sand layer 72 and separate the other filter layers 74, 76, 78. A pour-over drain 80 extends between the large stone layer 78 and a water reservoir 83 where the filtered water 84 collects. In alternative embodiments, the filter medium 72, 74, 76, 78 of the fast sand water filter may also comprise other materials in addition to (or instead of) sand, stone, or rock. For example, the fast sand water filter may comprise multiple materials including (but not limited to) metals, plastics, glass, composites, diatomaceous earth, or essentially any other filtering material capable of filtering dust and/or pathogens from a water solution.

For the purposes of this disclosure, a "pour over drain" comprises a drain configured to enable a fluid to drain laterally from one discrete area to another. In the preferred embodiment, the pour-over drain 80 comprises a perforated pipe, however in alternative embodiments, the pour-over drain 80 may comprise a tubular length of wire mesh, or any other permeable means of transferring filtered water/liquid from the lowest filter medium 78 to the reservoir 83 side of the filter system 70. Ultimately filtered/recycled particulate-free water 84 flows from the coarse filtering medium 78 into the water reservoir 83. For the purposes of this disclosure, "filtered/recycled fluid" comprises a fluid (such as acid or water) that has been through a filtration process. For example, a fluid that been through a fast sand water filter or a fast sand-type acid filter. In the preferred embodiment, the filter process removes at least particulate matter such as dust and/or pathogens.

In the preferred embodiment, the reservoir side 83 of the fast sand water filter system 70 preferably includes a float switch 92 that activates a valve 93 (connected to the fast sand water filter system controller 95) that opens when the water level gets below a predetermined level and introduces "tap" water into the reservoir 83 from an outlet 82 in the direction of the arrow 81 until the water level in the reservoir 83 reaches the desired depth at which time the valve 93 closes and turns the tap water off. The tap water that flows into the reservoir 83 may be from municipal sources or water from wells, rainfall collected from animal housing roofs, or surface water from ponds, lakes, rivers, or streams. The float switch 92, which is identical in function to that used inside of a commode or toilet, is needed to replenish water losses from evaporation or other loss mechanisms. In at least one alternative embodiment, the water filter system controller 95 communicates via a wired or wireless link 94 with the main system controller 65 (shown in FIG. 2).

The fast sand filter reservoir 83 also comprises an overflow pipe 97 which controls the upper limit of the water level in the reservoir 83. In the preferred embodiment, this pipe 97 is connected to a filter field (not shown) adjacent to facility 14—which is very similar to that utilized for wastewater disposal in sewage systems utilizing septic tanks. The system 70 is designed so that if water enters the system 70 at an unanticipated rate (for example when the inside of the air scrubber 15 is being cleaned by power-washing), then the reservoir water 84 will flow (preferably via gravity) out of the filter system 70 via the outlet 97 in the direction of the arrow 99. In the preferred embodiment, the overflow water is directed to a filter field (not shown) adjacent to the facility 14.

Figure 3:
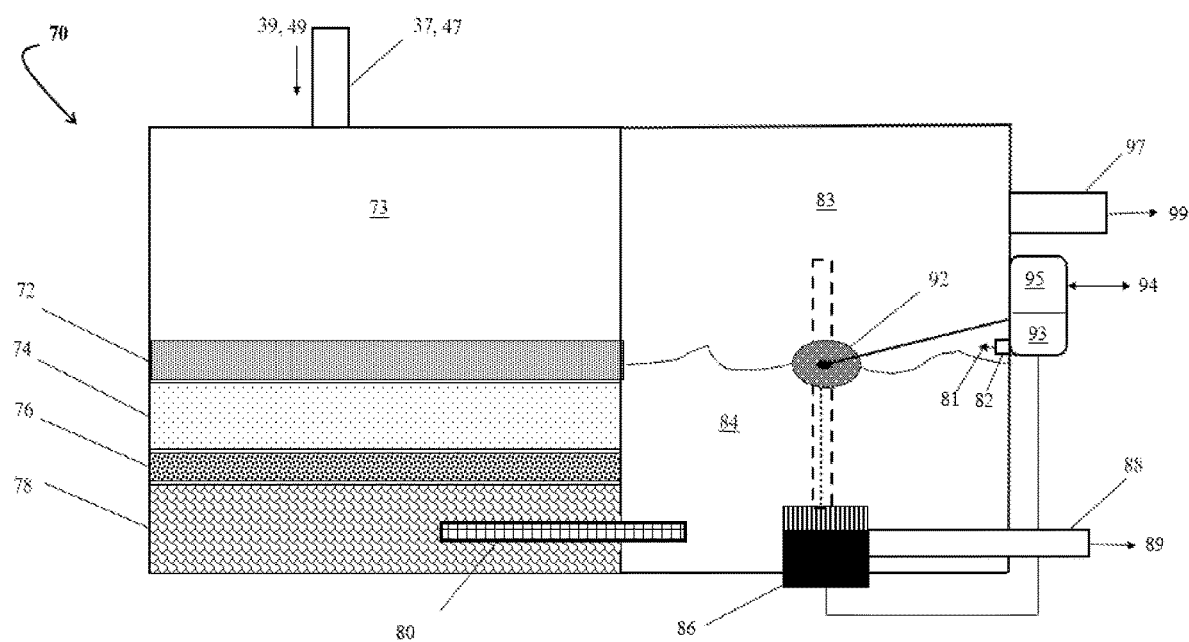
FIG. 3 is a cross-sectional schematic view of a fast sand water filter system 70 which removes particulate matter from water being sprayed in the air purification and circulation system 10.
Figure 4:
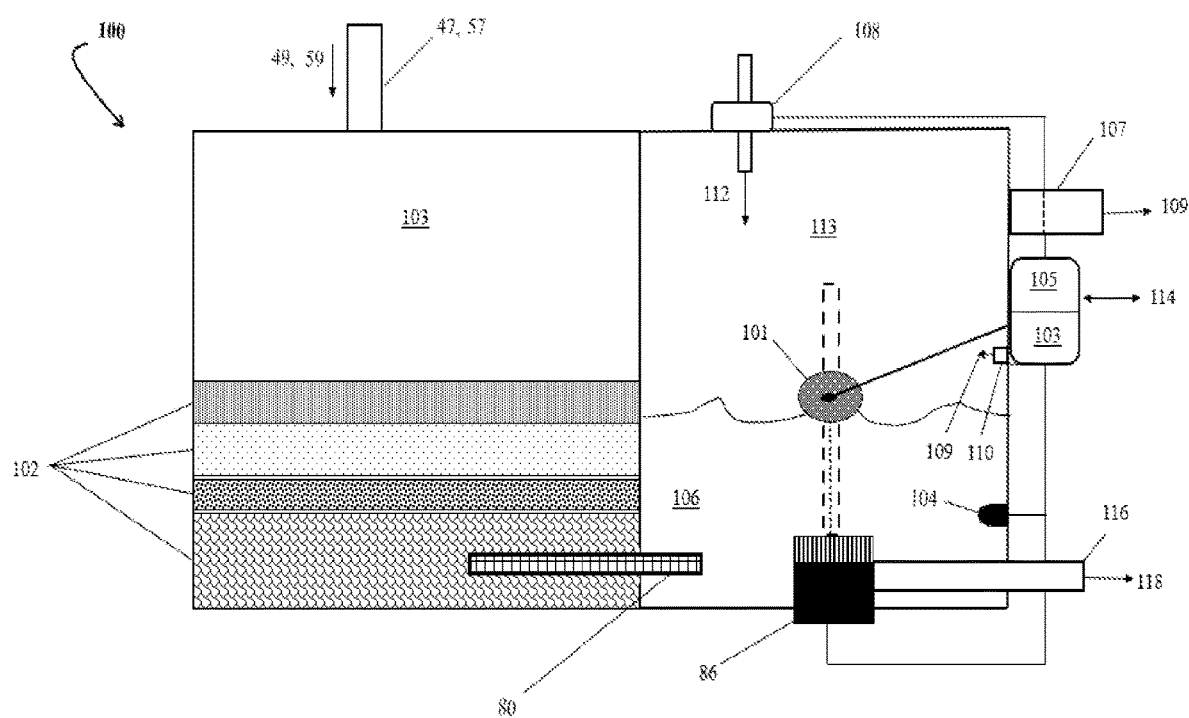
FIG. 4 is a sectional schematic view of an acid filter system 100 which removes particulate matter from the acid solution being sprayed in the ammonia scrubber section 40.

The dust in the air of poultry houses 14 includes large quantities of poultry manure, which has high concentrations of many nutrients, including ammonium, magnesium and phosphate which can precipitate in pipes under certain conditions as the mineral struvite ($NH_4MgPO_4 \cdot 6H_2O$) causing blockage of the pipes. Hence, it is possible that this could occur in pipes leading to or from the fast sand filter 70 if the pH and nutrient levels of the water were right for its formation. One solution to this problem would be for the operator to allow "tap" water to continuously flow into the reservoir 83 at a very slow rate, such as a few gallons per day, diluting the nutrient concentration so that struvite will not form. The excess water would flow through the pipe 97 into the filter field.

As best shown in FIG. 3, in the preferred embodiment the recycled/filtered water 84 is pumped out of the reservoir 83 by the recycle pump 86 through the outlet 88 in the direction of the arrow 89. As best shown in FIG. 1, the particulate-free water from the outlet 88 flows back into the dust scrubbing section 30 via a trunk line 29. In alternative embodiments, the recycled water 84 may be further treated and/or directed outside the system 10. For example, small amounts of flocculating agents could be added to this water to facilitate the removal of very small particulate matter, soluble organic compounds and other matter, by sand filtration.

The dust scrubbing section 30 may also comprise an electrostatic charging system 31 that imparts an electrical charge to the water droplets that comprise the fine water mist. Multiple types of electrostatic charging systems 31 are available. All electrostatic charging systems 31 capable of imparting an electrical charge to the fine water mist as the mist is sprayed within the dust scrubbing section 30 should be considered to be within the scope of the invention.

As shown in FIG. 2, when the air reaches the end of the dust scrubbing section 30, the air flows through a dust scrubbing section partition 34, which separates the dust scrubbing section 30 from the ammonia scrubbing section 40. In the preferred embodiment, the dust scrubbing section partition 34 comprises one or more planar, perforated/slotted, central structures 35 with a series of angled slats 36 extending out from the central structure 35 at (preferably but not exclusively) an angle of about 45 degrees—to thereby form a single "curtain"-type structure.

In FIG. 2, the dust scrubber section partition 34 is shown as having a single partition curtain. However, in alternative embodiments, the partition 34 may comprise multiple partition-type curtains 34 arranged in series.

In alternative embodiments, other types of partition 34 structures may be used. In further alternative embodiments demister(s) may be used rather than a simple slatted partition 34. As will be described infra, the structure and description of the ammonia scrubbing section partition 44, and the acid scrubbing section partition 54 are essentially identical to the structure of the dust scrubbing section partition 34 as shown in FIG. 2 and described supra. The main reason there are two separate sections (30 and 40) for scrubbing dust and ammonia is for conservation of acid. As mentioned earlier, dust contains large amounts of poultry manure, which has a tremendous amount of alkalinity that would neutralize as much or more of the acid than the ammonia in the airstream. This is also why there are separate sand filters for the water draining from the dust scrubbing and ammonia scrubbing sections; to reduce the amount of acid wasted on the neutralization of poultry house dust. However, as disclosed later there may be operations where two separate sand filters are not needed. After the air leaves the dust scrubbing section 30, the air flows into an ammonia scrubbing section 40.

The ammonia scrubbing section 40 is preferably positioned in tandem with the dust scrubbing section 30. In the ammonia scrubbing section 40, a particle-free dilute "acidic treatment solution" is sprayed from multiple acid sprayers 42, 43. For the purposes of this disclosure, an "acidic treatment solution" is defined as an acid/water solution having a pH of less than 7.0. In the preferred embodiment, the pH of the solution is less than 4.0. Further, in the preferred embodiment, the acid used in the ammonia scrubber section 40 should be a strong acid, such as sulfuric acid. However, in alternative embodiments, hydrochloric acid, phosphoric acid, nitric acid or multiple other types of acid may alternatively be used. The structure and basic spraying function of the acid sprayers 42, 43 in the ammonia scrubbing section 40 is essentially identical to the structure and function of the water sprayers 32, 33 described supra—except that the acid sprayers 42, 43 in the ammonia scrubbing section 40 spray an acidic treatment solution. The sprayers 42, 43 are designed to continuously deliver a particle-free fine spray of acidic treatment solution across the diameter of the ammonia scrubbing section 40. In the ammonia scrubbing section 40, the airborne ammonia and "fugitive dust" is removed from the incoming air by colliding with the fine acid droplets being sprayed via absorption.

The resulting (ammonia-containing) acid treatment solution and fugitive dust then falls to the bottom of the ammonia scrubbing section 40. and ultimately flows out of the section 40 through a drain 47 in the direction of the arrow 49. For the purposes of this disclosure, "fugitive dust" is defined as any dust that remains airborne and is not successfully removed from the incoming air in the dust scrubbing section 30. Fugitive dust may be present in the ammonia scrubbing section 40, the acid scrubbing section 50, or the outlet section 60. An objective of the current invention is to remove all dust (including fugitive dust) from the air before the (treated) air is exhausted back into the animal rearing facility 14. Significantly, the amount of acidity present in acidic treatment solution that is sprayed in the ammonia scrubbing section 40 is significantly greater than the alkalinity that results from the absorption of the airborne ammonia. Eventually, as best shown in FIGS. 2, an "acidic solution" flows out of the ammonia scrubbing section 40 through a drain line 47 in the direction of the arrow 49. In this disclosure an "acidic solution" is defined as a solution with a pH of less than 7.0 which may also comprise entrained particulate material. As best shown in FIG. 1, the drain line 47 extends from the ammonia scrubbing section 40 to the acid filter system 100 so that the acidic solution is directed to the acid filter system 100. The acid filter system 100 is a "fast sand-type filter system". A "fast sand-type filter system" (like the current acid filter 100) is similar to the "fast sand water filter system" 70 (as shown in FIG. 3) and is needed since there will likely be dust captured by the acid solution which was not captured in the dust scrubber section, however there are some key differences between the two sand filters. For the purposes of this disclosure, the "acid filter system" 100 (as shown in FIG. 4) is defined as a layered filter system wherein the filtering medium/material is acid resistant. The acid filter system 100 comprises fine grains/nodules at the upper surface of the filter, and progressively larger grains/nodules as the filter medium extends downwardly away from the top surface of the filter. The acid filter medium 102 must comprise materials that are impervious to the acidic treatment solution used in the air recirculation and purification system 10.

Significantly, the filtering materials 102 of the acid filter system 100 are not limited to sand/rock, but the acid filter system 100 may comprise any nodules/grains of the appropriately sized medium/materials consistent with the functions of filtering the liquid and remaining impervious to the type of acid sprayed in the ammonia scrubbing section 40. For example, the acid filter medium/materials 102 may comprise multiple other materials including (but not limited to) metals, plastics, glass, composites, stone, sand, rock, diatomaceous earth, or essentially any other acid resistant filtering particulate materials from the water solution. Ultimately, filtered/recycled acidic treatment solution 106 flows from the filtering medium 102 through a pour-over drain 80 and into the filtered/recycled acid reservoir 113. Similar to the water filter system 70, the acid filter system 100 includes a float switch 101 that opens a valve 103 attached to the acid filter system controller 105 when the acid level gets below a predetermined level. When the valve opens, "tap" water flows into the reservoir 113, 106, through the outlet 110 in the direction of the arrow 109 until the acid/water level reaches the desired depth—at which time the valve 103 closes and the flow of tap water is stopped. This type of float switch, which is almost identical to that used inside of a commode or toilet, is needed to replenish losses due to evaporation or other mechanisms. In at least one alternative embodiment, the acid filter system controller 105 communicates via a wired or wireless link 114 with the main system controller 65 (shown in FIG. 2). The fast sand filter acid reservoir 113 will also have an overflow pipe 107 which controls the upper limit of the acid solution level in the reservoir. In the preferred embodiment, this pipe is connected to a filter field (not shown) adjacent to facility 14 which is very similar to that utilized for disposing of wastewater in sewage systems utilizing septic tanks. The system 100 is designed so that if water enters the system 100 at an unanticipated rate (for example if the float switch 105 fails causing too much water to into reservoir 113), then the dilute acid 106 will flow (preferably via gravity) out of the filter system 100 via the outlet 107 in the direction of the arrow 109. In the preferred embodiment, the overflow acid is directed to a filter field (not shown) adjacent to the facility 14.

The FIG. 4 acid filter system 100 also includes a pH sensor 104 that senses the pH of the acidic liquid 106 and communicates the pH measurement back to an acid filter acid filter system controller 105. The acid filter system controller 105 is in communication with a servomechanism 108 (preferably a programmable acid titrator) that turns on an acid pump (preferably) in the auxiliary concentrated acid tank 115 when the pH level rises above a preset level. For example, if the pH of the acid 106 in the reservoir 113 rises above pH 4, then the acid pump slowly pumps concentrated acid from the double-walled, above ground, auxiliary acid tank 115 (see FIG. 1) into the reservoir 113 until the pH is reduced back down to the desired preset level (pH 4 in this case).

In alternative embodiments, the acid pump in the concentrated acid tank 115 may be outside of the acid tank 115, and/or the pump may be manually operated to add additional acid to the acid filter reservoir 113. In an alternative embodiment acid can simply be added to the reservoir 113 manually without the aid of a pump.

As shown in FIGS. 1 and 4, the acid recycle pump 86 pumps the filtered/recycled acidic treatment solution 106 out of the acid filter system 100 through the outlet 116 in the direction of the arrow 118. As shown in FIG. 1, the recycled acidic treatment solution is preferably recycled back to the ammonia scrubbing section 40 via the extended supply outlet 116 and ultimately to the acid sprayers 42, 43 in the ammonia scrubbing section 40.

Over time the ammonium concentration in the acid solution 106 will increase until it reaches very high levels. When the ammonium concentration in the acid solution 106 reaches the desired level for fertilization of crops, then the operator could program the acid filter system controller 105 to stop adding acid to the reservoir 113. After some time, the ammonia being scrubbed from the air would neutralize the acidity of the acid solution 106 and the pH of this solution would increase. When the pH reached levels acceptable for crop fertilization (preferably between pH 5 and 7), the operator would be notified by the main system controller 65. The pH preferably should be above 5 to prevent soil acidification and below 7 to prevent ammonia volatilization during or after fertilization. If sulfuric acid is being used as the acid source, then the liquid ammonium fertilizer would be in the form of ammonium sulfate, whereas if nitric acid were used then the fertilizer would be ammonium nitrate, likewise if phosphoric acid was used then ammonium phosphate fertilizer would be formed, or if hydrochloric acid were used then ammonium chloride would be formed.

In an alternative embodiment, when the ammonium concentration in the acid solution 106 reaches the desired level for fertilization of crops, then the operator could program the pH control to stop adding acid to reservoir 113 and add base, such as, but not limited to, sodium hydroxide or sodium bicarbonate, to speed up the process of acid neutralization to pH 5-7.

In the preferred embodiment the neutralized ammonium solution would be pumped into a tank on a truck, which is driven to nearby fields in pastures or row crops and the liquid ammonium fertilizer can be applied as needed for crop growth.

In an alternative embodiment the neutralized ammonium solution can be pumped directly from the reservoir 113 onto pastures or row crops using irrigation equipment (i.e.— fertigation).

In an alternative embodiment, the ammonium solution can be pumped into trucks and transported to fertilizer plants where it can be further processed into solid ammonium fertilizers, such as ammonium sulfate, ammonium nitrate or ammonium phosphate.

In an alternative embodiment, when the ammonium concentration of the acid solution 106 reaches the desired level, but weather conditions or other variables are not favorable for fertilization of crops, then the operator could pump the contents into a much larger storage reservoir or a holding pond prior to neutralization.

The ammonia scrubbing section 40 may also comprise an electrostatic charging system 41 that imparts an electrical charge to the acidic treatment solution droplets being sprayed. Multiple types of electrostatic charging systems 41 are available. All electrostatic charging systems 41 capable of imparting an electrical charge to the fine water mist as the mist is sprayed within the ammonia scrubbing section 40 should be considered to be within the scope of the invention.

As shown in FIG. 1, the air in the ammonia scrubbing section 40 eventually flows through the ammonia scrubbing section partition 44 to the acid scrubbing section 50. The design of the ammonia scrubbing section partition 44 is essentially identical to the design of the dust scrubbing section partition 34 described supra and may or may not have a demister.

The acid scrubbing section 50 is configured to remove any remaining acid droplets or fumes from the air. The acid scrubbing section 50 is preferably positioned in tandem with the ammonia scrubbing section 40. In the acid scrubbing section 50, a fine particle-free water mist is sprayed from multiple water sprayers 52, 53. The structure and basic spraying function of the acid scrubbing section water sprayers 52, 53 is essentially identical to the structure and spraying function of the dust scrubbing water sprayers 32, 33 in the dust scrubbing section 30, except the size of the water droplets is larger (medium rather than fine) so that the drift of the water droplets into section 50 is minimized. The water sprayers 52, 53 in the acid scrubbing section 50 are designed to continuously deliver medium-sized water droplets across the diameter of the acid scrubbing section 50.

As shown in FIG. 2, acid droplets, acid fumes and fugitive dust that flows into the acid scrubbing section 50 combine with a particle-free water mist so that the acid fumes and fugitive dust are removed via absorption, resulting in a water solution that contains only trace amounts of acid and entrained fugitive dust particles. The water solution with entrained fugitive dust particles falls the bottom of the acid scrubbing section 50 and flows through drain 57 in the direction of the arrow 59.

As best shown in FIG. 1, the water solution flowing out of the acid scrubbing section 50 via the drain line 57 flows to a return trunk line 51, which subsequently flows into the fast sand water filter system 70. Once the water solution from the acid scrubbing section 50 enters the fast sand water filter system 70, the water solution from the acid scrubber mixes with the water from the dust scrubbing section so that the water is filtered/recycled as described supra with regard to the fast sand water filter system 70. Any trace amounts of acid in the acid scrubbing water solution will be neutralized by the bases contained in the dust scrubber section.

As shown in FIGS. 1 and 3, after the water filtering/recycling process is completed, the water is pumped out of the fast sand water filter system 70 through the outlet 88 and into the return trunk line 29. The return trunk line 29 directs the recycled water to the acid scrubbing section 50 and ultimately to the sprayers 52, 53, and the process repeats.

The acid scrubbing section 50 may also comprise an electrostatic charging system 51 that imparts an electrical charge to the water droplets being sprayed. Multiple types of electrostatic charging systems 51 are available. All electrostatic charging systems 51 capable of imparting an electrical charge to the fine water mist as the mist is sprayed within the acid scrubbing section 50 should be considered to be within the scope of the invention.

In further alternative embodiments, the liquid from acid scrubbing section 50 may be recycled through other means, or the liquid may be used for other purposes that are not associated with the air purification and recirculation system 10 so that the liquid flowing out of the acid scrubbing section 50 is not connected to a water filter system 70.

Air then flows through the acid scrubbing section partition 54 and leaves the acid scrubbing section 50. The design of the acid scrubbing section partition 54 is essentially identical to the design of the dust and ammonia scrubbing section partitions 34, 44 described supra and may or may not have a demister.

As shown in FIG. 1, after the air leaves the acid scrubbing section 50, the air flows into the air outlet section 60. In the preferred embodiment, the air flows through a demister 64 to remove any water or acid droplets that may still be present.

In the preferred embodiment, the demister 64 comprises a mist eliminator that is a vertically oriented chevron blade separator. After the air leaves the outlet section, the "treated air" is preferably directed to the front of the facility. For the purposes of this disclosure, "treated air" is defined as air that is essentially free of at least dust and ammonia.

Any water droplets formed in the demister will fall out of the air outlet section 60 and flow out of the air outlet section drain 67 in the direction of the arrow 69. As best shown in FIGS. 1 and 2, the water solution flowing out of the outlet section 60 via the drain line 67 flows into a return trunk line 51, which subsequently flows into the fast sand water filter system 70 and is filtered and recycled. The recycled water solution is then pumped out of the fast sand filter system 70 through the outlet 88 and into the trunk supply line 29.

As shown in FIG. 1, recycled particulate-free water is then directed from the trunk supply line 29 to either the dust scrubbing section 30 or the acid scrubbing section 50. In alternative embodiments, the fluid exiting the drain 67 may be filtered or recycled, as required by an operator. In the preferred embodiment, the treated air is vented generally upwardly and toward the front of the facility.

The air purification and circulation system 10 comprises various feedback systems that may monitor and/or control the function of the system 10. For example, a main system controller 65 comprises a processor and an operator's visual display 66 (such as a computer screen), a means of alerting an operator (such as a tone, bells, lights, or a prompt on another electronic device such as a cell phone), and a means for the operator to input instructions into the system (such as a touchscreen, keyboard, or mouse). The main system controller 65 may monitor the pressure in each air treatment apparatus section 20, 30, 40, 50, 60 and the ammonia and/or acid content of the treated air passing through the outlet section. The main system controller 65 may also monitor (as required) the conditions and status of the fast sand water filter system and the acid filter system via the associated controllers 95, 105.

Additionally, the operator's processor and visual display 66 is in communication (via the main system controller 65) with at least the variable speed fan 26 as well as the fast sand water filter system controller 95 and the acid filter system controller 105. Based on the ammonia content of the air flowing through the outlet section 60 (as measured by an ammonia sensor 71), the operator may manually or automatically adjust at least the speed of the fan 26 (if ammonia levels are high, then the fan speed is reduced), and the operator may also adjust other system parameters.

Additionally, the system 10 includes pressure sensors 38, 48, 58, 68 positioned in each air treatment apparatus section 30, 40, 50, 60 and outside of air treatment mechanism 15. The main system controller 65 monitors the pressure drop between each of the sensors 38, 48, 58, 68, and the ambient conditions outside of the scrubber. If reduced air flow occurs, as indicated by a slight pressure drop, then the fan speed may be automatically varied by the main system controller 65. Likewise, a significant pressure drop may indicate a blockage or other significant problems requiring the main system controller 65 to shut down at least the fan 26 and alert the operator.

In the preferred embodiment, the diameter/width and the length of each of the treatment sections 20, 30, 40, 50, 60 is 60" (1.524 m)— depending upon the needs of an operator and the specific dimensions and characteristics of the housing/rearing facility 14. The variable speed fan 26 preferably operates at 7,500 cfm (212.4 m$^3$/min or 3.54 m$^3$/s) and the air speed through the system 10 is 1.524 m/s so that the air residence time in each section 30, 40, 50, 60 would be 1.0 second.

In an alternative embodiment, particularly in an application in which the poultry producer has no land in pastures or crop production or does not wish to utilize the captured ammonia or cannot afford the system described above or for other reasons, the system described herein can be simplified (reduced) so that there is only one fast sand filter (fast sand filter 100) rather than two, which is used for acidic water purification. In this embodiment, referred to as the "one filter system", the drains 39, 49, 59, and 69 from sections 30, 40, 50 and 60 drain directly to the acid sand filter 100, and acidified water from reservoir 113 is pumped to all of the nozzles in sections 30, 40, and 50.

In a further embodiment of the one filter system described above, the captured ammonia is not utilized for pasture or crop production but is disposed of in the filter field. In this embodiment, water is slowly added either continuously or semi-continuously to reservoir 113 so that drainage is always occurring from pipe 107 into the filter field. In this case, the filter field should be properly designed so that it is large enough to process such a high nitrogen loading rate and the land should be limed regularly to avoid soil acidification. While disposing of an important nutrient resource in this manner is not as sustainable as using it for fertilizer, it is still far better for the environment than allowing the ammonia to escape the animal rearing facility into the atmosphere where it pollutes air, soil and water resources. From an economic point of view, the value of the ammonium being captured with this technology is relatively insignificant when compared to the tremendous economic gains from improved poultry production and reduced energy costs due to lower ammonia levels in the rearing facilities.

In another embodiment of the one filter system with "tap" water running continuously, the "tap" water source is from a well or surface water source (river, stream, pond or lake) with water that consistently has a pH at or below pH 7 is utilized so that no acid is added to reservoir 106. Such a system would not only require far lower investment costs but may also have lower operating costs since it does not use acid, even if the ammonium is not being utilized for fertilizer. It should be noted that the length of the air purification unit 15 would not likely be shortened with this system, even though there would not be separate sections for dust, ammonia and acid fume removal. The kinetics of ammonia scrubbing with solutions having pHs from 4 to 7 are much slower than when the pH is much more acidic, such as 2 to 4, hence, more residence time would be needed to remove the ammonia. This can be achieved by either slowing down the air flow of the variable speed fan or by increasing the area of the ammonia scrubber. Since sections 30, 40, and 50 would all be spraying slightly acidic water, the residence time of ammonia scrubbing would basically be tripled which would be needed for ammonia removal using water with low acidity.

In another embodiment of the one filter system, water is pumped directly from reservoir 113 and used for irrigation (fertigation) onto row crops or pastures. In another embodiment the water is pumped into a container or holding pond from which it is pumped onto row crops or pastures, providing both irrigation water and nitrogen fertilizer.

For the foregoing reasons, it is clear that the subject matter described herein provides an innovative air purification and circulation system 10 for air inside an animal rearing/sheltering facility 14. The current system may be modified in multiple ways and applied in various technological applications. The disclosed system may be modified and customized as required by a specific operation or application, and the individual components may be modified and defined, as required, to achieve the desired result.

Although the materials of construction are generally described, they may also include a variety of compositions consistent with the function described herein. Such variations are not to be regarded as a departure from the spirit and scope of this disclosure, and all such modifications as would be obvious to one skilled in the art are intended to be included within the scope of the following claims.

The amounts, percentages and ranges disclosed in this specification are not meant to be limiting, and increments between the recited amounts, percentages and ranges are specifically envisioned as part of the invention. All ranges and parameters disclosed herein are understood to encompass any and all sub-ranges subsumed therein, and every number between the endpoints. For example, a stated range of "1 to 10" should be considered to include any and all sub-ranges between (and inclusive of) the minimum value of 1 and the maximum value of 10 including all integer values and decimal values; that is, all sub-ranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the implied term "about." If the (stated or implied) term "about" precedes a numerically quantifiable measurement, that measurement is assumed to vary by as much as 10%. Essentially, as used herein, the term "about" refers to a quantity, level, value, or amount that varies by as much 10% to a reference quantity, level, value, or amount. Accordingly, unless otherwise indicated, the numerical properties set forth in the following specification and claims are approximations that may vary depending on the desired properties sought to be obtained in embodiments of the present invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The term "consisting essentially of" or excludes additional method (or process) steps or composition components that substantially interfere with the intended activity of the method (or process) or composition and can be readily determined by those skilled in the art (for example, from a consideration of this specification or practice of the invention disclosed herein). The invention illustratively disclosed herein suitably may be practiced in the absence of any element which is not specifically disclosed herein. The term "an effective amount" as applied to a component or a function excludes trace amounts of the component, or the presence of a component or a function in a form or a way that one of ordinary skill would consider not to have a material effect on an associated product or process.

What is claimed is:

1. An air purification and recirculation system positioned within an animal rearing/sheltering facility, the system comprising:
    a dust scrubbing section for scrubbing dust from air that is drawn into the system, the dust scrubbing section comprising at least one dust scrubbing section sprayer configured to spray a water mist droplet solution so that airborne dust collides with the water mist droplets to remove the airborne dust from the air by absorption, the combined water droplet solution with entrained dust particles falling to a bottom of the dust scrubbing section and flowing to a dust scrubbing section drain;
    an ammonia scrubbing section for scrubbing airborne ammonia and fugitive dust from the air, the ammonia scrubbing section being positioned in tandem with the dust scrubbing section so that air flowing out of the dust scrubbing section flows into the ammonia scrubbing section, the ammonia scrubbing section comprising at least one ammonia scrubbing section sprayer spraying acid treatment solution mist droplets, the acid treatment solution mist droplets collide with the airborne ammonia and fugitive dust so that the airborne ammonia and fugitive dust are removed from the air by absorption, the combined airborne ammonia and the acid treatment solution with entrained fugitive dust comprising an acidic solution, the acidic solution falling to a bottom of the ammonia scrubbing section and flowing to an ammonia scrubbing section drain;
    an acid scrubbing section for scrubbing acid fumes and fugitive dust from the air, the acid scrubbing section being positioned in tandem with the ammonia scrubbing section so that air leaving the ammonia scrubbing section flows into the acid scrubbing section, the acid scrubbing section comprising at least one acid scrubbing section sprayer configured to spray a water mist droplet solution so that the water mist droplets combines with airborne acid droplets, acid fumes and fugitive dust to create a water solution with entrained fugitive dust particles, the water solution with entrained fugitive dust particles falling to a bottom of the acid scrubbing section and flowing to an acid scrubbing section drain;
    wherein the system is structured so that, as the air is drawn into the system, the dust scrubbing section removes airborne dust from the air, the ammonia scrubbing section removes airborne ammonia and fugitive dust from the air, and the acid scrubbing section removes any remaining airborne acid droplets, acid fumes and fugitive dust from the air, so that treated air is recirculated back into an interior of the animal rearing/sheltering facility; and
    wherein the water solution with entrained dust particles from the dust scrubbing section and the acid scrubbing section, flow into a fast sand water filter system so that the fast sand water filter system separates the dust particles from the water solution.

2. The system of claim 1 wherein the fast sand water filter system comprises a water filter medium side, and a water reservoir side.

3. The system of claim 2 wherein the water filter medium side comprises a water filter medium having fine grain sand/rocks at a top of the water filter medium, and progressively larger grain-sized sand, then rocks/stones as the depth of the water filter medium increases.

4. The system of claim 3 further comprising a pour-over drain extending from about a bottom of the water filter medium, to a water reservoir on the water reservoir side.

5. The system of claim 4 wherein the water reservoir side comprises at least a recycle pump, the water reservoir side being configured so that the recycle pump continuously pumps filtered/recycled water from the water reservoir back to the water sprayers in the dust scrubbing section and the acid scrubbing section.

6. The system of claim 4 wherein, in the water reservoir side, a float switch monitors a water level of the water reservoir so that when the water level gets below a predetermined minimum level, the float switch causes an inlet valve to open and add water to the water reservoir until the water reservoir level rises above the predetermined minimum level.

7. The system of claim 4 wherein the water reservoir side is configured so that when a water level of the water reservoir gets above a predetermined maximum level, overflow water flows out of the water reservoir through an overflow pipe outlet.

8. The system of claim 2 wherein the water filter medium side includes a water filter medium comprising rock, comprising at least one of stone, sand, metals, plastics, glass, composites, diatomaceous earth, or any other filtering means capable of filtering dust from a water solution with entrained dust particles.

9. The system of claim 1 wherein liquid solutions from the dust scrubbing section, the ammonia scrubbing section, and the acid scrubbing section are all directed to the fast sand water filter system so that the fast sand water filter system filters the dust from the liquid solutions.

10. The system of claim 1 wherein the acid solution from the ammonia scrubbing section flows to an acid filter system.

11. The system of claim 10 wherein the acid filter system comprises an acid filter medium side, and an acid reservoir side.

12. The system of claim 11 wherein the acid filter medium side comprises an acid resistant filter medium, the acid resistant filter medium comprising fine grain acid resistant materials at a top of the acid filter medium, and progressively larger grain acid resistant materials as the depth of the acid filter medium increases.

13. The system of claim 12 further comprising a pour-over drain extending from about a bottom of the acid filter medium, to an acid reservoir on the acid reservoir side.

14. The system of claim 13 wherein the acid reservoir side comprises at least a recycle pump, the acid reservoir side being configured so that the recycle pump continuously pumps filtered/recycled acid from the acid reservoir back to the acid sprayers in the ammonia scrubbing section.

15. The system of claim 11 wherein, the acid reservoir side comprises an acid reservoir, a float switch monitors a fluid level of the acid reservoir so that when the acid fluid level gets below a predetermined minimum level, an inlet valve opens to add water to the acid reservoir until the acid fluid level rises above the predetermined minimum level.

16. The system of claim 15 wherein the fast acid reservoir side is configured so that when the acid level in the acid reservoir gets above a predetermined maximum level, overflow acid flows out of an outlet overflow pipe.

17. The system of claim 11 wherein the acid reservoir side comprises an acid reservoir, a pH sensor in the acid reservoir measures a pH of the acid in the reservoir.

18. The system of claim 17 wherein the pH sensor comprises a programmable acid titrator.

19. The system of claim 17 wherein the pH sensor communicates the pH measurement to an acid filter controller that is in communication with a servomechanism;
wherein the acid reservoir side is structured so that when the pH sensor senses that the acid reservoir pH is above a predetermined maximum level, the servomechanism opens an associated valve and thereby adds an acid solution to the acid reservoir until the pH level recedes below the predetermined maximum level.

20. The system of claim 17 wherein, when the pH sensor senses that the acid reservoir pH is above a predetermined maximum level, an operator manually adds an acid solution to the acid reservoir until the pH level in the acid reservoir recedes below the predetermined maximum level.

21. The system of claim 1 wherein the system further comprises an air treatment apparatus inlet section, the air treatment apparatus inlet section being oriented so that an inlet aperture of the air treatment apparatus inlet section is covered with a screening structure and the inlet aperture faces downwardly.

22. The system of claim 21 wherein air is drawn through the air treatment apparatus and conveyed to a variable speed fan.

23. The system of claim 1 further comprising an outlet section of the air treatment apparatus, outlet section being positioned in tandem with the acid scrubbing section, so that treated air flows into the outlet section from the acid scrubber section, and then the treated air flows upwardly through a demister and back into the animal rearing/sheltering facility.

24. The system of claim 23 wherein the lowest portion of the air treatment apparatus outlet section comprises a fluid drain, the outlet section fluid drain flowing to the fast sand water filter system.

25. The system of claim 1 is configured so that the air treatment apparatus inlet section, the dust scrubbing section, and acid scrubbing section, and the outlet section are connected to form a unitary linear air treatment apparatus.

26. The system of claim 1 wherein the air treatment apparatus is mobile and comprises wheels and a trailer hitch-type connection so that the system is designed to be towed into and out of, animal rearing/sheltering facilities.

27. The system of claim 26 wherein the air treatment apparatus further comprises an elevating mechanism so that the inlet section and front portion of the treatment apparatus is elevated so that fluid falling to a bottom of an air treatment section flows rearwardly.

28. The system of claim 25 wherein a first permeable partition separates the air treatment apparatus inlet section from the dust scrubbing section, a second permeable partition separates the dust scrubbing section from the ammonia scrubbing section, a third partition separates the ammonia scrubbing section from the acid scrubbing section, and a fourth partition separates the acid scrubbing section from the outlet section, the treated air being exhausted through a demister at an end of the outlet section and into the animal rearing/sheltering facility.

29. The system of claim 1 wherein electrostatic charging systems impart a positive charge to water or acid droplets in one or more of the dust scrubbing section, the ammonia scrubbing section, and/or the acid scrubbing section.

30. The system of claim 1 wherein pressure sensors monitor pressure in one or more of the dust scrubbing section, the ammonia scrubbing section, the acid scrubbing section, and/or the outlet section.

31. The system of claim 30 wherein the system further comprises a main system controller, the main system controller monitoring feedback and communicating with at least the pressure sensors, an ammonia sensor in the outlet section, the fast sand water filter system controller, and the acid filter system controller.

32. The system of claim 31 wherein the main system controller further comprises a processor, and an operator's visual display, a means of alerting an operator, and a means for an operator to input instructions into the system.

33. The system of claim 32 wherein an operator's visual display comprises at least a computer screen, a means of alerting an operator comprises at least a means of sending an alert message to an operator's cell phone, and a means for inputting instructions comprises at least a keyboard, mouse and/or a computer touch screen.

34. A method of purifying and recirculating air within an animal rearing/sheltering facility, the method comprising the steps of:
(a) providing the system of claim 1 and drawing air into the system;
(b) removing dust from the air in a dust scrubbing section;
(c) removing airborne ammonia and any fugitive dust from the air in the ammonia scrubbing section;
(d) removing acid droplets, acid fumes and any fugitive dust from the air in the acid scrubbing section;
(e) directing water from the dust scrubbing drain to the fast sand water filter system where particulate matter is removed from the water droplet solution with entrained dust particles; and
(f) exhausting treated air back into animal rearing/sheltering facility.

35. The method of claim 34 wherein, in step (b), removing dust from the system by spraying water droplets in the dust scrubbing section so that the water droplets collide with the airborne dust, to remove the airborne dust from the air by absorption, the combined water droplet solution with entrained dust particles falling to the bottom of the dust scrubbing section and flowing to the dust scrubbing section drain.

36. The method of claim 34 wherein the recycled water solution is directed back to the sprayers in the dust scrubbing section or the sprayers in the acid scrubbing section.

37. The method of claim 34 wherein in step (c) air from the dust scrubbing section flows into the ammonia scrubbing section, in the ammonia scrubbing section, acid treatment solution mist droplets collide with the airborne ammonia and fugitive dust so that the airborne ammonia and fugitive dust is removed from the air by absorption, the combined airborne ammonia with entrained fugitive dust and the acid treatment solution, comprise an acidic solution, the acidic solution falling to the bottom of the ammonia scrubbing section and flowing to the ammonia scrubbing section drain.

38. The method of claim 37 wherein the acidic solution with entrained fugitive dust from the ammonia scrubbing section drain is directed to the acid filter system where the fugitive dust particles are removed from the acidic solution to produce a recycled acid treatment solution.

39. The method of claim 38 wherein acid and/or water is optionally added to the recycled acid treatment solution.

40. The method of claim 39 wherein the recycled acid treatment solution is directed back to the sprayers in the ammonia scrubbing section.

41. The method of claim 34 wherein, in step (d), air from the ammonia scrubbing section flows into the acid scrubbing section, acid droplets and fumes in the air are removed from the acid scrubbing section by spraying water droplets so that the water droplets collide with the acid droplets and fumes to remove the any acid droplets, acid fumes and fugitive dust from the air by absorption, the combined water droplet solution with entrained fugitive dust particles falling to the bottom of the acid scrubbing section and flowing to the acid scrubbing section drain.

42. The method of claim 41 wherein water from acid scrubbing drain is directed to the fast sand water filter system where fugitive dust particulate matter is removed from the water droplet solution to produce a recycled water solution.

43. The method of claim 42 wherein the recycled water solution is directed back to the sprayers in the dust scrubbing section or the acid scrubbing section.

* * * * *